March 10, 1936. H. B. VAN SINDEREN 2,033,793
AUTOMOBILE BODY
Filed July 11, 1934 2 Sheets-Sheet 1
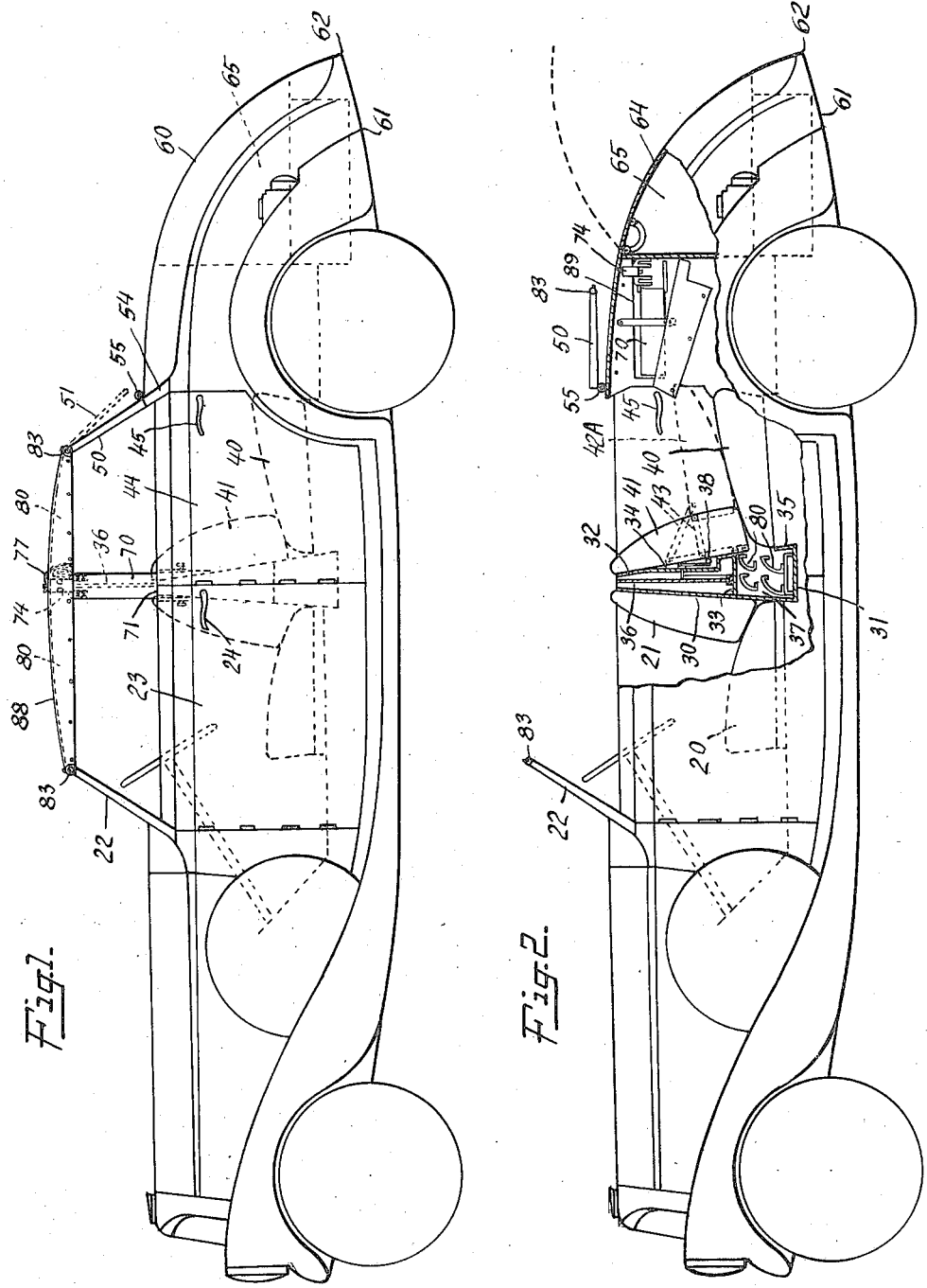
INVENTOR
Henry B. Van Sinderen
BY
Marshall O. Hawley
ATTORNEYS March 10, 1936. H. B. VAN SINDEREN 2,033,793
AUTOMOBILE BODY
Filed July 11, 1934  2 Sheets-Sheet 2
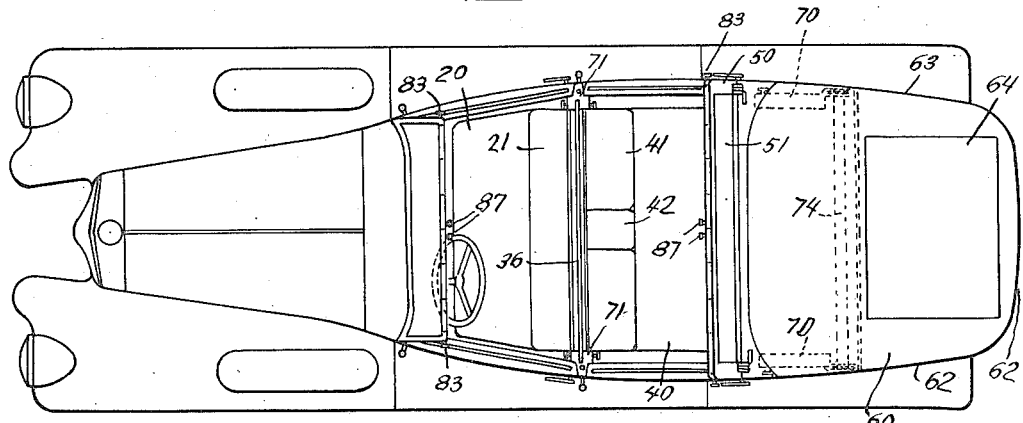
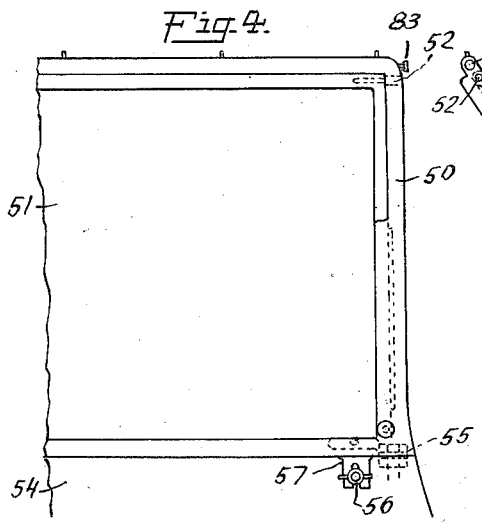
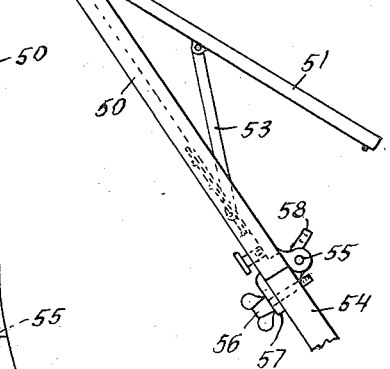
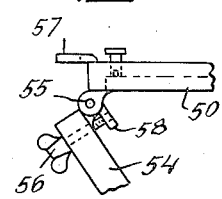
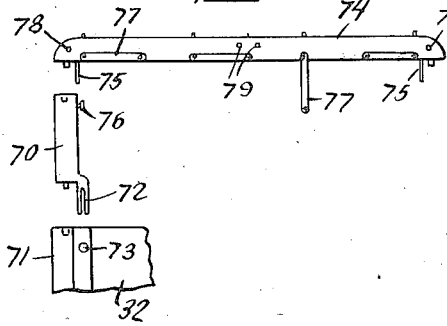
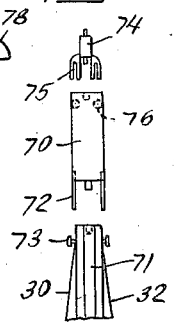
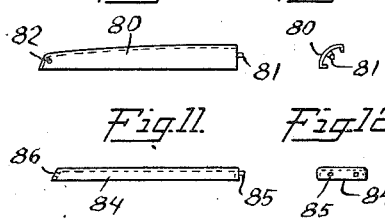
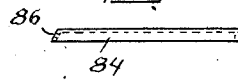
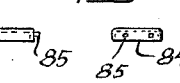
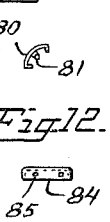
INVENTOR
Henry B. Van Sinderen
BY
Marshall & Hawley
ATTORNEYS Patented Mar. 10, 1936

2,033,793

UNITED STATES PATENT OFFICE 2,033,793

AUTOMOBILE BODY

Henry B. Van Sinderen, Washington, Conn.

Application July 11, 1934, Serial No. 734,571

3 Claims. (Cl. 296—1)

This invention relates to improvements in automobile bodies and its object is to provide a construction in which the available room may be utilized to a greater extent than has been possible with former bodies.

A further object is to provide a seating arrangement by which all of the passengers will have equal comfort and visibility.

Another object is to provide a top of novel construction, a part or all of which may be removed and may be disassembled and stored in parts of the body which are made to receive them. I have also designed a rear windshield with an adjustable transparent panel supported in a frame which may be swung down out of the way and securely held in either of its position. I have also provided ample storage room and have shaped the rear surfaces of the body in such a way as to prevent road dust from following the car and to minimize the air resistance of the body.

These and other objects of the invention will appear in the following specification in which I will describe the invention and will point out its novel features in appended claims.

Referring to the drawings,

Fig. 1 is a side elevation of an automobile body which is made according to and embodies my invention. In this figure the top is up and I have also indicated in dotted lines the position of the rear portion of the top cover when it is rolled up;

Fig. 2 is a similar view of the body with the parts which form the top folded and stowed. Parts of the body are shown in section in order to illustrate clearly the arrangements for storing the parts of the top. In this figure the rear windshield is swung to its down position;

Fig. 3 is a plan view of the body shown in the preceeding figures, without its top;

Fig. 4 is a rear elevation of a part of the rear windshield and Fig. 5 is a side elevation of the same;

Fig. 6 is a side elevation of the rear windshield illustrating in detail its hinge-lock in a different position from that in which it is shown in Fig. 5;

Fig. 7 is a rear elevation of the transverse bow of the top frame and one of its supporting posts, and Fig. 8 is a side elevation of the parts shown in Fig. 7;

Fig. 9 is a side elevation of one of the side bars of the top frame and Fig. 10 is an end view of the same;

Fig. 11 is a side elevation of one of the central longitudinal bars of the top frame, and Fig. 12 is an end view of the same;

The chassis, running gear, fenders and parts of the body which cover the engine are of conventional design and form no part of my invention. The front seat 20 with its back 21 and the front windshield 22 are also similar to those commonly used. On both sides of the front seat are substantially rectangular doors 23, the front edges of which are supported, preferably by four hinges each, as shown, with latches 24 near their rear edges by which they may be held closed. It is obvious that when these doors are open free, unobstructed access to the front seat is afforded.

30 is a flat transverse partition immediately behind the seat back 21 and extending from the top of said back to a bottom piece 31. A similar partition 32, separated from partition 30 extends down to a horizontal plate 33. The central part of this partition 32 is pressed inwardly as at 34. The lower rear end of partition 30 is bent upwardly to form a lip 35. Partitions 30 and 32 converge toward the top and beteween them and above plate 33 are guides and operating mechanism for a vertical windshield 36. A storage compartment 37 is thus formed between partition 30, base 31 and plate 33. A crank 38 for raising and lowering windshield 36 is on the rear side of partition 32 in the center of its indented portion 34.

40 is a rear seat, the bottom of which extends rearwardly from the top of lip 35. Its removal gives access to the compartment 37. 41 is the back of the rear seat. The central part 42 (Fig. 3) of this back is pivoted on links 43 by means of which it may be swung downwardly and rearwardly to the position in which it is shown at 42A in Fig. 2. In this position it affords access to the crank 38 and provides a wide arm rest for the comfort of the passengers on the rear seat.

Doors 44 supported by four hinges at their forward edges provide convenient side entrance to the rear seat without requiring the passengers to climb into the vehicle through the rear end thereof, as is necessary with former constructions. 45 designates the rear door latch.

Pivoted to the deck over the rear end of the back seat is a windshield frame 50. This is arranged to be held in the position in which it is shown in Fig. 1, or in the position in which it is shown in Fig. 2. A glass panel 51 is pivoted in the upper part of this frame at 52. The details of this rear windshield are shown in Figs. 4, 5 and 6. The glass panel may be swung into adjusted positions and held by links 53 pivoted to the edges of the panel with their lower ends arranged to engage with the frame 50.

The frame 50 is supported on a bridge 54 by pivots 55. When it is raised, wing-bolts 56 which pass through lugs 57 on the frame and are screwed into the bridge 54 hold it securely in place. This is shown in Figs. 4 and 5. When the frame 50 is lowered the wing-bolts 56 pass through the bridge 54 and are screwed into other lugs 58 on the frame, as shown in Fig. 6. Thus, the frame is rigidly maintained in either of its positions.

The rear end of the body comprises upper and lower convex surfaces 60 and 61 respectively, which meet in a substantially horizontal line 62 and diverge forwardly. Between the parts which form the surfaces 60 and 61 are sides 62, 63 with outer convex surfaces which converge toward the rear. The meeting edges of the sides with the upper and lower surfaces are rounded. This stream line form of the rear end of the body effectively prevents dust from following the car and annoying the passengers on the rear seat and reduces the air resistance of the body.

The upper deck which forms the surface 60 is provided with a hinged panel 64 by which access to a luggage compartment 65 is obtained.

The top frame comprises a pair of side posts 70, the inner surfaces of which are grooved to form tracks for the middle windshield 36, as shown in Fig. 3. These posts rest upon bases 71 at the ends of the panels 30, 32. They have spaced slotted plates 72 at their lower ends by which the posts 70 are secured to the bases 71 by means of set screws 73. The transverse bow 74 is affixed to the upper ends of posts 70 by means of slotted plates 75 and set screws 76. 77 are straps for holding the cover 88 when it is rolled up, as shown in Fig. 1.

80 is one of the four side bars of the top frame. Each of them is provided at one end with a rectangular dowel 81 which fits into one of the holes 78 in the transverse bow 74, and with a hole 82 at its other end by which it is fastened to the front or rear windshield by screws 83.

84 is one of two central longitudinal bars. Each is provided at one end with a pair of spaced dowels 85 which fit into holes 79 in the transverse bow 74 and with spaced holes 86 at its other end by which it is fastened to the front or rear windshield by screws 87.

88 is the cover. This is fastened to the top frame thus described, by means of buttons in the usual manner. Either the front or the back part of the cover may be rolled up and held by the straps 77. In Fig. 1 the back part of the cover is shown in dotted lines as rolled up. When either the front or rear part of the cover is rolled up, the corresponding longitudinal bars of the frame may be removed, if desired. Each of the doors has glass panels which may be raised to close the sides. These are not shown as they are of the usual construction.

When the top frame is disassembled, the transverse bow may be held under the rear deck 60 immediately in front of the luggage compartment. The posts 70 may be stowed conveniently in side pockets 89 (Fig. 2) under the rear deck and the longitudinal center and side bars 84 and 80 together with the cover 88 may be stowed in the compartment 37 between the seats.

In addition to the advantages before enumerated, it will now be seen that this invention makes a single vehicle available for use in several different forms. It may be used as an open car with or without the central and rear windshields; it may be used as a covered car or with either the front or rear covered, and with its door panels raised it may be entirely closed.

What I claim is:

1. An automobile body comprising front and rear seats extending from each other in opposite directions, a permanent structure between said seats forming a back for both of them, side doors at the ends of both seats, a closed space back of the rear seat, a rear deck permanently covering said enclosed space, a windshield frame pivotally mounted on said deck and an adjustable transparent panel in said frame.

2. An automobile body comprising front and rear seats extending from each other in opposite directions, side doors at the ends of both seats, a permanent structure between said seats forming a back for both of them, a windshield vertically movable in said permanent structure, means for raising and lowering said windshield, and a movable section in the part of said structure which forms the back for one of the seats arranged to provide access to said raising and lowering means.

3. An automobile body comprising front and rear seats extending from each other in opposite directions, side doors at the ends of both seats, a permanent structure between said seats forming a back for both of them, a windshield vertically movable in said permanent structure, means for raising and lowering said windshield, and a pivoted section in the central part of said structure which forms the back for one of the seats arranged to be moved into position to form an arm rest and to provide access to said raising and lowering means.

HENRY B. VAN SINDEREN.